United States Patent [19]

Wille

[11] 4,028,840

[45] June 14, 1977

[54] TROLLING SKI

[76] Inventor: Mark E. Wille, 2954 N. 124th St., Wauwatosa, Wis. 53222

[22] Filed: Apr. 23, 1976

[21] Appl. No.: 679,827

[52] U.S. Cl. .................................. 43/43.13; 43/17; 43/43.12; 43/43.14

[51] Int. Cl.² ........................................ A01K 93/00

[58] Field of Search ........... 43/43.13, 43.12, 43.14, 43/17

[56] References Cited

UNITED STATES PATENTS

| 780,029 | 1/1905 | Flegle | 43/43.13 |
|---|---|---|---|
| 2,597,288 | 5/1952 | Caldwell | 43/43.13 |
| 2,958,153 | 11/1960 | Yerman et al. | 43/43.14 |
| 3,081,575 | 3/1963 | Meisner | 43/43.12 |
| 3,507,068 | 4/1970 | Roberts | 43/17 |

*Primary Examiner*—Louis G. Mancene
*Assistant Examiner*—Daniel J. Leach
*Attorney, Agent, or Firm*—Joseph J. Jochman, Jr.

[57] ABSTRACT

A trolling ski for carrying a fishing line away from the side of a boat includes a two line attachment, a fish-activated line release adapted to prevent fouling of the fishing line, and a hollow cellular body which is compartmentalized to provide for the selective addition or removal of ballast in order to compensate for variation in the weight of fishing tackle being towed.

8 Claims, 3 Drawing Figures

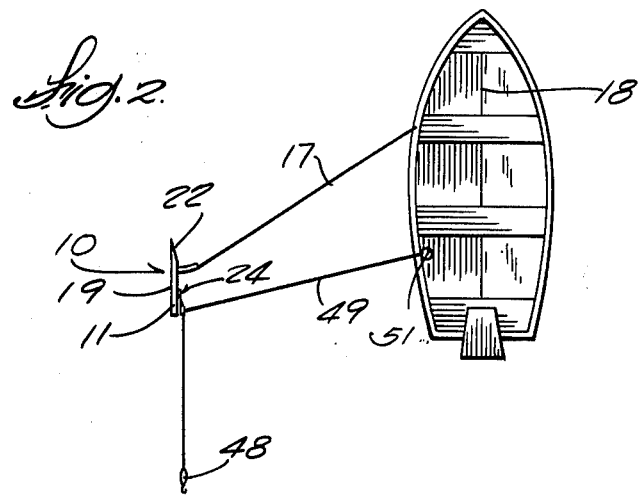
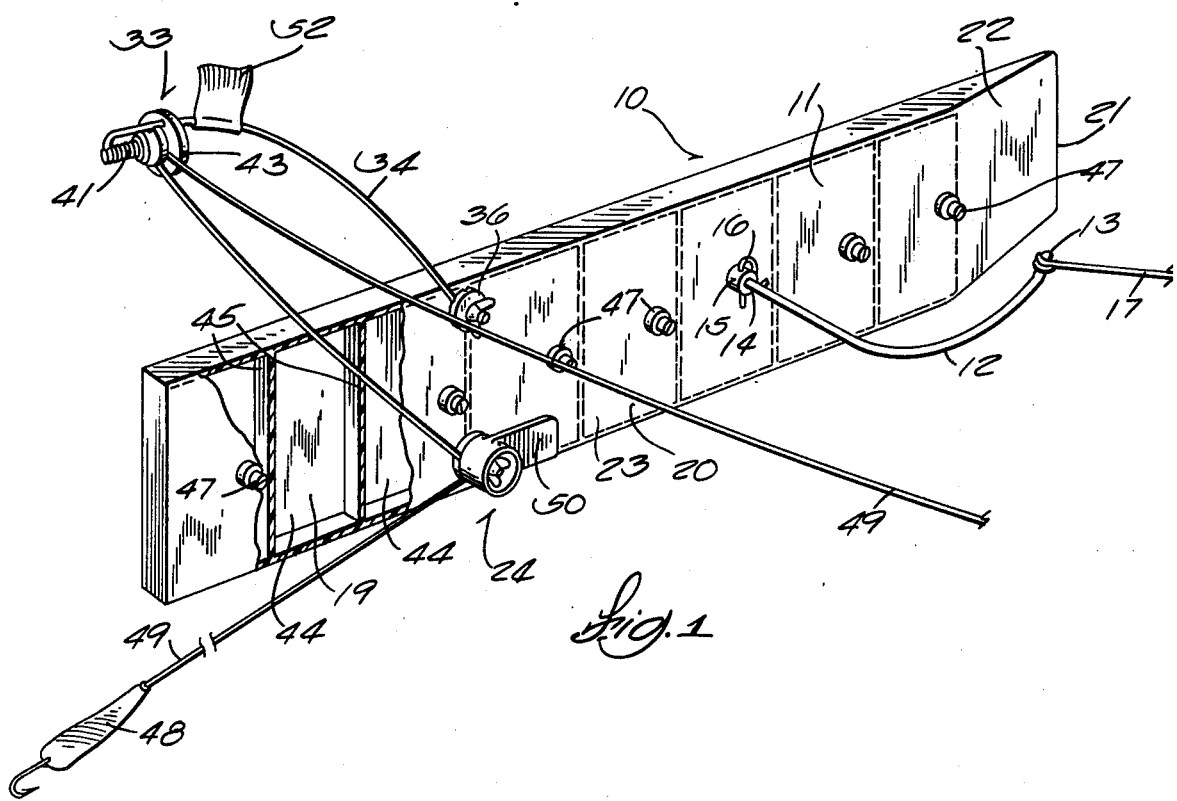

TROLLING SKI

BACKGROUND OF THE INVENTION

1. Field of the Invention

Trolling skis or other boards, as they are also sometimes called, are well known in the art. Such a ski or board is useful, when fishing by means of trolling from a moving boat, to carry a fishing line laterally away from the side of the boat.

2. Description of the Prior Art

It may be desirable to carry a trolling line away from the side of a boat either to provide room for additional lines or to keep the bait or lure being trolled from following directly in the path of the boat. A trolling ski has a buoyant and generally streamlined body to allow it to move easily through the water. The ski is pulled by a towline from the boat and includes some kind of rudder surface such that the movement of water against it as it is being towed moves and keeps the ski laterally away from the boat. The ski also includes a fish line holder and release to hold the trolling line at the length selected for fishing, but to allow it to be released from the ski when a fish is hooked. Trolling skis may also be effectively used in fishing a stream from the bank or shore, where the flow of the water will have the same effect on the ski as would towing it from a boat, and it can thus be used to carry a fishing line out from the shore. Prior art trolling skis have generally all exhibited several basic operating difficulties. Most skis have a single unvariable buoyancy and can effectively handle only a rather small range of weights of fishing tackle, and the use of tackle that is either too heavy or too light may cause poor or totally unsatisfactory ski performance. Likewise, the fishing line holder and release must be able to accommodate the same range of tackle weights and, heretofore, no single ski has been able to provide a wide range and uniformly equal balance in both buoyancy and the weight of tackle that can be used. Another problem that has affected the performance of many prior art skis is the fouling of the fishing line on the line release mechanism or on other parts of the ski. Prior art skis all generally have a line holder and release that provides a single line attachment point on the ski body from which the line extends in one direction, directly to the fishing pole or other source of the line in the boat, and in the other direction, rearwardly from the ski to the bait or lure. A sagging of or slackening in the ski tow line, as often occurs because of wave action on the boat, the ski, or both, will cause a like slackening in the fishing line which often results in its tangling or fouling in the line release or on another part of the ski.

SUMMARY OF THE INVENTION

In the present invention, a trolling ski is provided with a hollow cellular interior, each cell of which may be selectively filled with a ballast, most conveniently water, to accommodate a wide range of weights of fishing tackle. The ski may operate from nearly empty for heavy tackle to nearly full for light tackle and, in any situation, the ballast can be so adjusted to float the ski at the depth required for optimum performance. The primary fishing line holder and release is a spring clamp that is adjustable to handle the same wide range of tackle weights as the ski itself. The invention further includes a secondary line holder and release mounted on a flexible rod extending upwardly from the ski body. The line from the fishing pole is extended to the secondary holder and release on the flexible rod which is of substantial length such that the line from the boat is held out of the water and snagging or fouling of the line on the ski is eliminated. In the preferred embodiment, the fishing line is extended from the secondary release on the flexible rod to the primary release on the ski body, and the rod is bent slightly and held by line tension such that its release when a fish strikes provides a visual signal.

BRIEF DESCRIPTION OF THE DRAWINGS

FIG. 1 is a perspective view of the trolling ski of the present invention, fully rigged for fishing, with a portion of the ski broken away to show the interior construction.

FIG. 2 is a reduced plan view of the ski operatively attached to a boat.

DESCRIPTION OF THE PREFERRED EMBODIMENT

Figure 3:
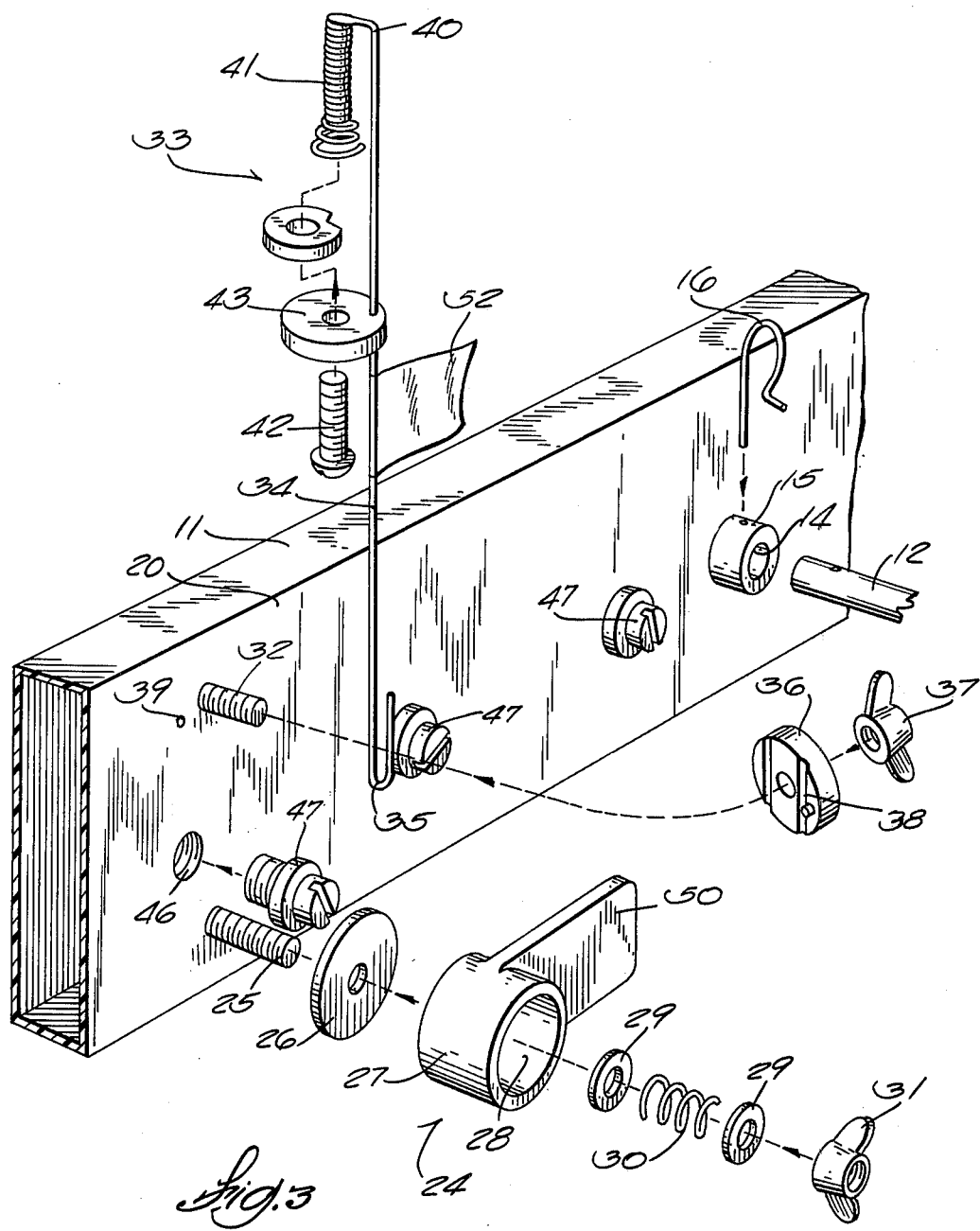
FIG. 3 is a perspective view of the ski including exploded views of the tow line and fish line attachment assemblies.

Referring to FIG. 1, a trolling ski 10 of the present invention has a long, relatively thin and generally rectangular body 11. The ski 10 is buoyant and, when properly rigged as will be hereinafter described, is adapted to float on its edge and to move in the direction of its longer dimension.

Extending laterally from one side of the body 11 at approximately the center is a tow bar 12. The tow bar is rigid and formed preferably of stainless or plated steel. It is also preferably bent and attached to the body 11 so that its distal end 13 extends upwardly and slightly forwardly, as well as laterally, of the body. The proximal end 14 of the tow bar 12 is attached to the body and held against both lateral displacement and axial rotation. In the preferred embodiment shown, the tow bar 12 is demountably attached to the body by inserting the proximal end 14 into the bore of a bushing 15 which is molded into or otherwise affixed to the body 11. A suitable locking pin 16 is inserted through aligned holes in the tow bar and bushing wall to hold the bar in operative position. The distal end 13 of the tow bar is provided with a ring or other means to which a tow line 17 extending from a boat 18 may be attached.

The body 11 of the ski 10 has a front side 19 away from the boat 18 which side is substantially flat along its entire length and is vertically disposed when the ski is rigged and operating. The second side 20, nearest the boat, includes a substantially flat forward portion which intersects the first side 19 at the forwardmost edge 21 of the ski and extends rearwardly therefrom and diverges from the first side 19 to form a rudder surface 22. The remaining rearward portion 23 of the second side 20 is also substantially flat and lies parallel to and closely spaced from the first side 19. The rearward portion 23 preferably comprises the major portion of the length of the ski with the shorter forward portion disposed so that the rudder surface 22 forms a distinct and relatively sharp acute angle with the first side 19. On the lower portion of the second side 20, or the side nearest the boat, and rearwardly of the center of the ski is located the primary fish line holder and release 24. Referring particularly to FIG. 3, the release assembly includes a threaded stud 25 affixed to and extending laterally out from the body 11. A back up washer 26 and a clip member 27, each having a bore there through of a diameter slightly greater than that of the stud 25, are placed on the stud with the washer 26 lying against the side 20 of the body 11. The clip member 27 is provided with a counterbore 28 in its outer face into which the stud 25 extends when the clip member is placed on the stud and against the washer 26. A pair of washers 29, separated by a coil spring 30, are all inserted into the counterbore 28 and onto the end of the stud 25. The entire assembly is held together on the stud with a wing nut 31, the threading of which onto the stud 25 and against the compressive force of spring 30 produces a clamping force between the abutting faces of washer 26 and clip 27. Preferably, the stud 25 does not extend outwardly beyond the clip member, and the wing nut, washer 29 and spring 30 all lie within the counterbore 28 when assembled.

Extending laterally out from the upper portion of the same side of the body 11, parallel to and in approximately the same vertical plane as the stud 25, is a second stud 32 for attachment of a secondary line holder and release 33. The secondary release 33 includes a flexible rod 34 having means at one end for attachment to the second stud 32. In the preferred embodiment, the end 35 of the rod 34 is bent to form a U-shape which is adapted to fit around the stud 32 and to be held against the side of the body 11 by a locking washer 36 and a wing nut 37. As will be explained in greater detail below, the rod 34 must be held against rotation about the stud 32 and preferably held in a nearly vertical position. To hold the rod against rotation, the locking washer 36 is provided with a groove 38 for receipt of the U-shaped end 35 of the rod. The grooved side of the locking washer 36 is further provided with a small protrusion (not shown) adapted to be received and seat in a mating depression 39 projecting from the side 20 of the body adjacent the stud 32. When the locking washer 36 is seated on the stop 39, and secured with the rod end 35 in the groove 38 by tightening wing nut 37, the rod 34 extends vertically upward from the top of the ski.

The opposite upper end 40 of the rod is bent to form an L-shape and to the end is welded or otherwise affixed a conical coil spring 41. An adjusting screw 42 carrying a pair of release washers 43 is threaded into the narrower portion of the conical spring 41. The wider, open end of the spring bears against the face of one of the washers 43 and the compression of the spring created by the tightening of adjusting screw 42 provides a clamping force between the abutting faces of the washers 43.

The body 11 of ski 10 has a hollow interior comprising a series of longitudinally spaced cells 44. The cells are separated by vertical ribs 45 and access to each cell 44 is provided by means of a small circular opening 46 in the side 20 of the body. The openings 46 are equally spaced along approximately the horizontal centerline of the body and threaded for receipt of correspondingly threaded plugs 47. The entire body 11 is preferably molded of plastic with each cell 44 being water tight with respect to adjacent cells and to the outside of the body. Thus, any cell or combination of cells may be selectively filled with a ballast, preferably water, by removing the appropriate plug or plugs 47 and immersing the ski in water or otherwise conveniently filling the cells.

To rig the ski for fishing, the appropriate number and arrangement of cells 44 are filled with water, in accordance with the weight of the tackle 48 being used, so that the ski operates approximately three-fourths submerged. For example, with light tackle 48 of less than about one-half pound, the ski will operate at the optimum level of three-fourths submerged if all cells 44 are filled. When running heavy tackle 48 of approximately 3 pounds, only the forwardmost cell, lying immediately behind the rudder surface 22, is filled. As the weight of the tackle being used decreases, the number of cells filled with water increases.

Next, the primary fish line holder and release 24 is adjusted to provide the proper clamping force to hold the fish line 49. The line 49 is inserted between the abutting faces of the back up washer 26 and the clip member 27, as shown in FIG. 1, by pressing inwardly on the lever 50 to force the back edge of clip 27 to open against the compression of spring 30. When the lever is released, the line 49 is clamped between the washer 26 and clip 27, and wing nut 31 is adjusted to provide just enough clamping force to carry the weight of the tackle 49. With the primary release 24 so adjusted, the line 49, which is normally attached to a rod and reel or other source 51 in the boat 18, can be let out to the length desired for fishing and attached at that point to the release 24.

Then the flexible rod 34 of the secondary release 33 is bent rearwardly so that its upper portion is disposed at an cute angle to the vertical. The line 49 extending from the primary release 24 back to its source 51 is attached intermediately to the secondary release by slipping it between the faces of washers 43. Adjusting screw 42 is set to clamp the line so that the tension in the portion of the line between the primary and secondary releases is sufficient to hold the rod 34 in its "set" or bent position.

With the ski rigged as just described, the tow line 17, attached to the tow rod 12, is let out as the boat 18 moves forward, and the movement of the water against the rudder surface 22 of the ski carries it laterally and rearwardly away from the boat, as shown in FIG. 2. The fish line 49 is let out simultaneously with the tow line and preferably slightly in excess of the length of the tow line such that the tow line tension is not imparted to the fish line.

When a fish strikes the baited end of the line 49, the increase in line tension exceeds the clamping force of the primary release 24 and the line is released therefrom. The resultant momentary loss in tension in the section of line 49 between the primary release and the secondary release 33 causes the flexible rod 34 to snap forward, and the immediately following take-up of line tension caused by the weight of the tackle and bait and the forward movement of the ski, pulls the line 49 free of the clamping force of the secondary release 33. The line 49 is then free of the ski and the fisherman in the boat may play and land the fish in the usual manner.

The flexible rod 34 of the secondary release may be provided with a flag 52 to give a visual indication that a fish is on the line by virtue of its movement from the set to the unflexed position. Aslo, the substantial height to which the rod extends above the ski body and the water, even in the bent or set position, aids significantly in keeping the line out of the water and thus avoids or substantially precludes the chance of the line fouling on some part of the ski. To further aid in preventing fouling of the line because of its tendency to occasionally wrap or loop around the secondary relese assembly 33, the washer 43 adjacent to adjusting screw 42 may be of a larger diameter than its mating washer. The enlarged diameter portion is provided with a hole through which is inserted the rod 34 prior to assembly of the release. When so assembled, the space between the assembly 33 and the upper end of the rod 34 is closed against accidental entry and fouling of the line 49 as it sags due to wave action.

What is claimed is:

1. A trolling ski adapted to be towed by a boat and to carry a fishing line laterally away from the boat comprising:
    a. a buoyant elongated body;
    b. first means on the body for attaching a tow line extending from the boat thereto;
    c. second means on the body for demountably attaching a fishing line at a point on the line intermediate the boat and the end of the line;
    d. at least a portion of the body defining a hollow closed interior; and,
    e. closure means providing communication with the hollow closed interior for the addition and removal of ballast.

2. The invention of claim 1 wherein the body is generally rectangular and is adapted to float with its shorter dimension vertically disposed and to move in the direction of its longer dimension.

3. The invention of claim 2 wherein the hollow closed interior comprises a cellular construction forming a plurality of chambers along the length of the body and the closure means comprises a demountable plug for each chamber.

4. The invention of claim 3 wherein the body includes:
    a. a substantially flat first side away from the boat;
    b. a second side nearest the boat having a rudder surface intersecting the first side at the forward edge thereof and extending rearwardly and diverging from the first side along a portion of the length of the side, the remaining portion of the second side lying parallel to and closely spaced from the first side.

5. The invention of claim 2 wherein said first means comprises a rigid tow bar having a proximal end demountably attached to the body and a distal end providing attachment for the tow line.

6. The invention of claim 3 wherein said second means comprises a first adjustable compression spring clamp adapted to hold the fishing line to the body in opposition to a preselected level of line tension and to release the same when said tension is exceeded.

7. The invention of claim 6 wherein said second means further comprises:
    a. A thin, flexible rod attached to and extending upwardly from the body;
    b. a second adjustable compression spring clamp affixed to the upper end of the rod adapted to hold the fishing line at a point between the first spring clamp and the boat in opposition to a second preselected level of line tension and to release the same when said second level of tension is exceeded.

8. The invention of claim 2 wherein said body is of molded plastic construction.

* * * * *